July 30, 1929. C. L. BURGHER Re. 17,386
MEANS OF HEATING INCLOSURES ELECTRICALLY
Original Filed Oct. 27, 1925
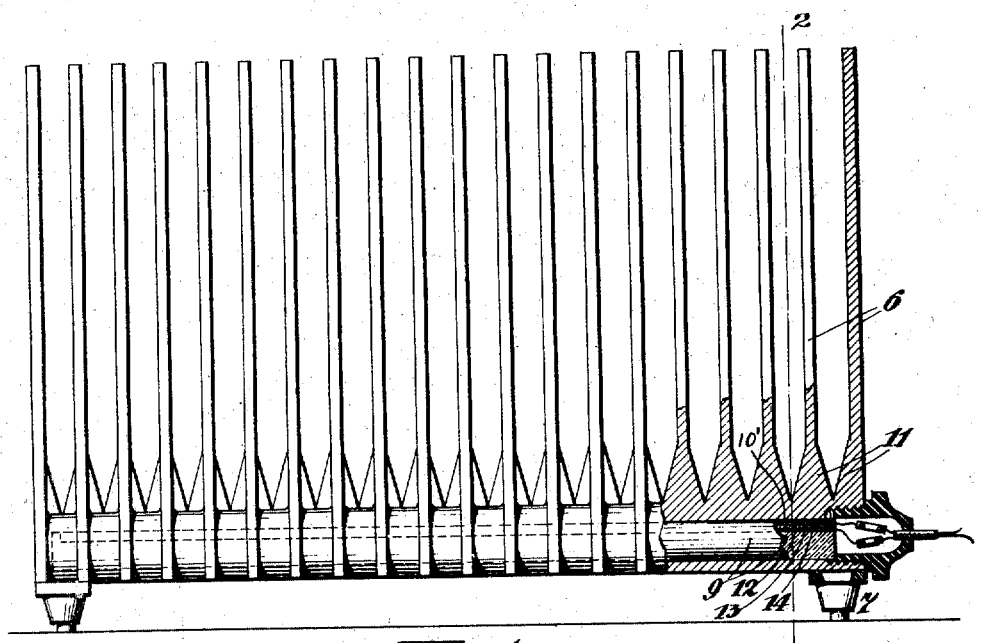
Fig. 1.
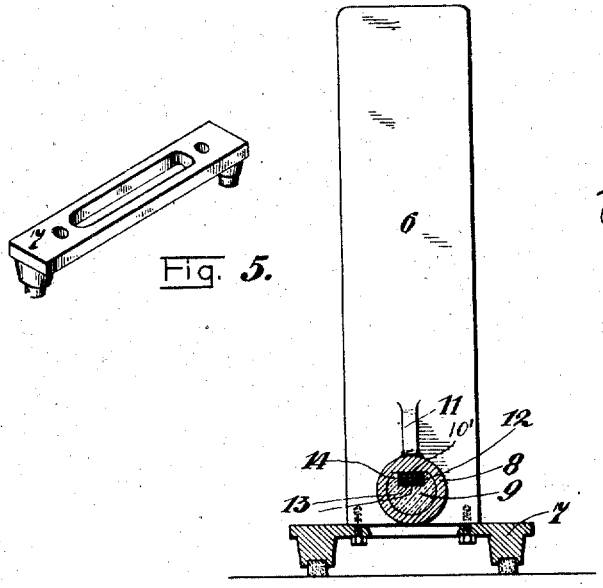
Fig. 2.
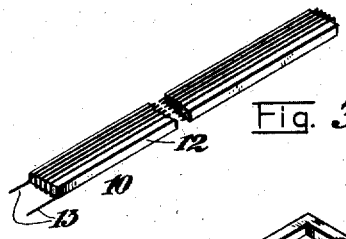
Fig. 3.
Fig. 5.
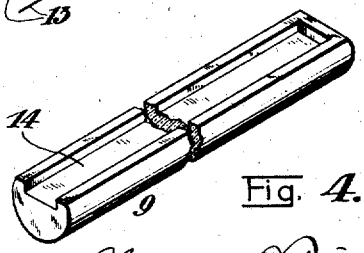
Fig. 4.
Clarence L. Burgher
INVENTOR Reissued July 30, 1929. Re. 17,386

UNITED STATES PATENT OFFICE.

CLARENCE L. BURGHER, OF NEW YORK, N. Y.

REISSUED

MEANS OF HEATING INCLOSURES ELECTRICALLY.

Original No. 1,660,218, dated February 21, 1928, Serial No. 65,106, filed October 27, 1925. Application for reissue filed May 24, 1929. Serial No. 366,074.

My invention relates to electric heaters of the class in which a heat conducting tube, inclosing an electrical heating element electrically insulated therefrom but in heat conducting relation thereto, is provided with a longitudinal series of vertically arranged transverse radiating plates in heat conducting contact with the tube to transfer the heat from the resistant of the heating element to the vertical sections of air between the plates.

My invention consists primarily in prolonging the plates vertically from the tube a length relatively great compared to the width of the plates so as to form heated and unimpeded vertical air ducts, into the lower ends and open sides of which the cool air passes and rises between the walls of the ducts formed by the plates in the form of a horizontal series of vertical columns of air, which are progressively heated on both sides by prolonged contact with the heated walls of the ducts and are thus impelled rapidly upward, so as to accelerate the circulation of the heated air columns upward from the ducts and throughout the room or inclosure to be heated, substantially as hereinafter more fully set forth.

In order that my invention may be fully understood, I shall first describe in detail the mode in which I at present prefer to carry the invention into practice and then particularly point out the invention in the claim.

Reference is to be had to the accompanying drawings forming part of this application in which like parts are designated by the same numbers in all the figures.

Figure 1 is a longitudinal sectional elevation of an electric heater embodying my invention.

Figure 2 is a cross-sectional elevation of the same on the line 2—2, Figure 1.

Figures 3 and 4 are detail views of parts of the electric heating element used in this embodiment of my invention.

Figure 5 is a detail view of one of the end bases of the same.

In the particular embodiment of my invention thus illustrated, 8 designates a horizontal tube which may be of any suitable section and of any metal or material of good heat conductivity, such as aluminum, bronze, brass, copper or iron. In this example the tube is shown supported on end bases 7. In the tube 8 is placed an electrically insulated tube heating element which may be of any efficient and suitable character. In the present illustration of my invention, the heating element consists of a bar 9 of electric insulating and heat insulating material, such for example as clay or a compound thereof, having a longitudinal groove 14 along its upper side, in which is seated a resistant holder 10 consisting of a flat bar 12 of electric insulating but heat conducting material, such as, for example, alundum or asbestos, around which is wrapped, in this example, lengthwise, the coil of resistant wire 13 connected to the source of electricity. This wire I, at present, prefer to make of nickel chromium.

The resistant holder 10 is by preference covered on top by a sheet 10′ of electric insulating but heat conducting material, such as, for example, asbestos or alundum, no thicker than necessary to prevent escape of electricity from the resistant wire 13 to the tube 8.

In the present illustration of my invention I have shown the upper and inner surface of the tube 8, as well as the upper surface of the resistant bar 9 and resistant holder 10 flattened to bring the heated resistant wire and its holder 10 as closely in contact as possible with the upper wall of the tube 8 and relatively remote from the lower wall of the tube 8 so as to transfer as much as possible of the heat to the upper wall of the tube 8. This unnecessary waste of heat downward is also avoided in this illustration by the relatively greater thickness of the heat insulating bar 9 below the resistant wire 13.

On the horizontal tube 8 is fixed in close heat conducting relation thereto, and, in this example of my invention, formed integrally therewith, a longitudinal series of vertically arranged transverse plates 6, which are prolonged vertically from the tube 8 to a great height relatively to their width so as to form a horizontal series of vertical air ducts whose walls formed by the plates 6 receive the heat by convection directly from the tube 8 and the electric heating element inclosed therein and in heat conducting contact therewith.

I at present prefer to make the plates or duct walls 6 of aluminum, but they may be made of any other good heat conducting metal or material, and although shown in this example as formed integrally with the tube, they may be made separately and fixed thereon by swaging or by any other approved method so as to bring them into intimate heat conducting relation thereto.

The plates 8 are here shown straight in horizontal cross section, which form is preferred, but it is evident that the ducts may be made of any other form in section appropriate to their effective functioning as herein set forth.

As hereinbefore briefly described, the cool air drawn into the lower ends and open sides of the vertical ducts is divided by the walls formed by the plates 6 into a longitudinal series of relatively thin vertical columns of air, which, as they ascend between the heated walls of the vertical ducts, are confined therebetween and progressively heated by the prolonged contact on both sides therewith, and their ascent thus continuously and progressively accelerated. The result is that, instead of a relatively stationary or slowly rising and laterally diffusing overheated body of air around the heating element and underheated air in the remainder of the room or inclosure, I obtain a greatly accelerated ascent of warm columns of air through the heated ducts and upward therefrom and thus a forced circulation and distribution of evenly heated air throughout the entire inclosure.

While I prefer to make the heating tube 8 horizontal as shown and the duct-forming plates rising therefrom as shown for reasons of effectiveness and convenience it is evident that the tube may be arranged at any inclination with respect to the horizontal and the vertical duct-forming plates may either rise or fall or both rise and fall vertically therefrom without changing the relative functions of the tube and plates, and other mechanically equivalent variations in construction may be made in the actual practice of my invention without departing from the boundaries thereof as set forth in the following claim:

I claim as my invention:

An electric heater comprising a heat conducting tube, an electric heating element extending through and in heat conducting relation to the tube, but electrically insulated therefrom, and a longitudinal series of vertical heat conducting plates fixed to the tube in heat conducting relation thereto, said plates being substantially free of intervening obstructions and of a length relatively great compared to their width, and forming a longitudinal series of heated vertical air ducts.

In testimony whereof I affix my signature.

CLARENCE L. BURGHER.